United States Patent
Adler et al.

(10) Patent No.: US 8,824,526 B2
(45) Date of Patent: Sep. 2, 2014

(54) APPARATUS AND METHOD FOR ANTENNA DIVERSITY RECEPTION

(75) Inventors: Bernd Adler, Neubiberg (DE); Elmar Wagner, Taufkirchen (DE); Christian Drewes, Germering (DE); Clemens Buchacher, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1190 days.

(21) Appl. No.: 12/708,351

(22) Filed: Feb. 18, 2010

(65) Prior Publication Data

US 2011/0201297 A1   Aug. 18, 2011

(51) Int. Cl.
*H04B 7/08* (2006.01)
*H04B 7/10* (2006.01)

(52) U.S. Cl.
CPC ............ *H04B 7/0868* (2013.01); *H04B 7/0822* (2013.01); *H04B 7/10* (2013.01); *H04B 7/084* (2013.01)
USPC ...................................................... 375/148

(58) Field of Classification Search
USPC ...................................................... 375/148
See application file for complete search history.

(56) References Cited

U.S. PATENT DOCUMENTS

| | | | | |
|---|---|---|---|---|
| 5,335,251 | A * | 8/1994 | Onishi et al. | 375/347 |
| 6,571,090 | B1 * | 5/2003 | Moriyama et al. | 455/277.1 |
| 7,376,406 | B2 * | 5/2008 | Iwakuni | 455/269 |
| 2004/0170219 | A1 * | 9/2004 | Sasaki et al. | 375/148 |
| 2005/0152264 | A1 * | 7/2005 | Siwiak | 370/206 |
| 2007/0223601 | A1 * | 9/2007 | Frank | 375/260 |
| 2007/0243839 | A1 * | 10/2007 | Kostic | 455/132 |

OTHER PUBLICATIONS

Hammerschmidt, J., et al., "Comparison of Single Antenna, Selection Combining, and Optimum Combining Reception at the Vehicle," IEEE Vehicular Technology Conference (VTC Fall), Sep. 1999, pp. 11-16, Amsterdam.

* cited by examiner

*Primary Examiner* — Jaison Joseph
(74) *Attorney, Agent, or Firm* — Eschweiler & Associates, LLC

(57) ABSTRACT

An apparatus provides a baseband signal for exploiting receive antenna diversity by means of a digital baseband processor. The apparatus includes a combiner configured to temporally alternately select at least one sample of a first received signal corresponding to a first receive antenna and at least one sample of a second received signal corresponding to a second receive antenna and to interleave the selected samples of the first and second received signal to obtain a temporally continuous stream of samples of a baseband representation of a combined signal at an output of the combiner as the baseband signal for exploiting receive antenna diversity.

6 Claims, 12 Drawing Sheets

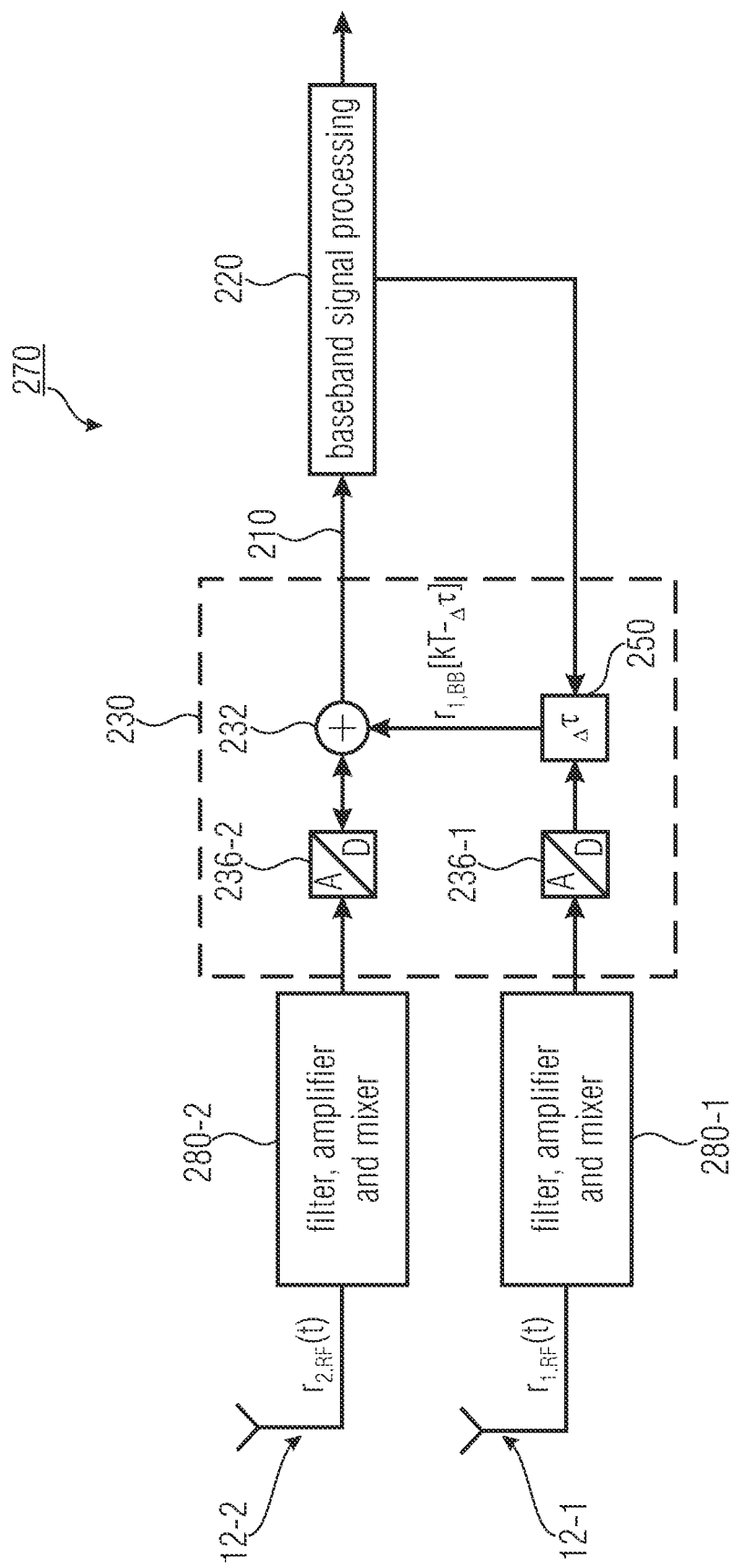

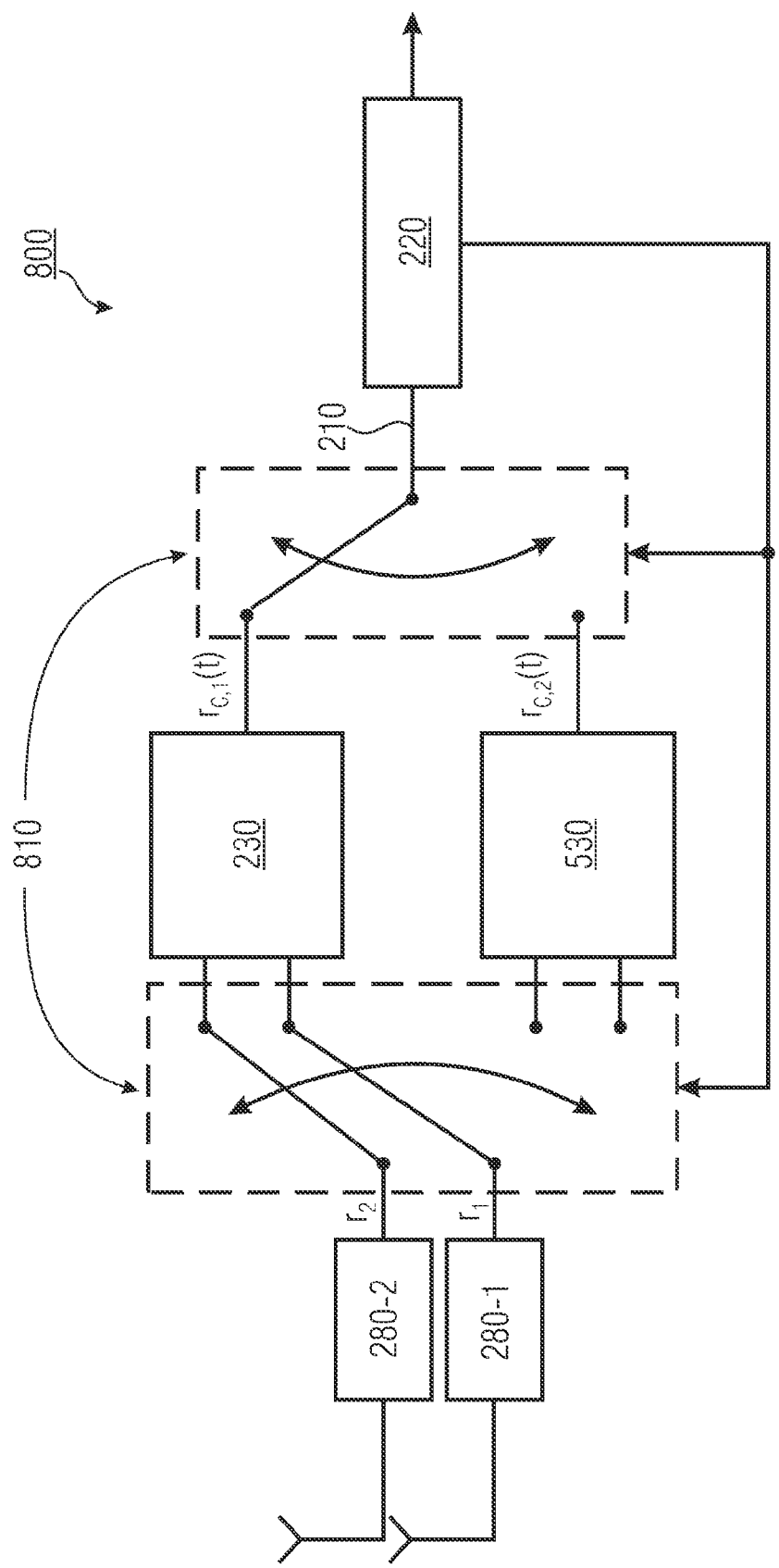

APPARATUS AND METHOD FOR ANTENNA DIVERSITY RECEPTION

TECHNICAL FIELD

Embodiments of the present invention relate to exploiting receive antenna diversity using single-antenna digital baseband processing concepts.

BACKGROUND

Multi-antenna systems for mobile communications have been intensively discussed recently. In a single input multiple output (SIMO) case, one transmit antenna at the base station and multiple receive antennas at the mobile station are applied. The latter is, in particular, of interest for mobile phones using high data rates in a downlink, i.e., base station-to-mobile direction. Commonly-used multiple antenna receiver architectures need separate receive chains from each receive antenna to digital baseband, including an RF (Radio Frequency) path and a digital baseband processing path for each receive antenna, which is non-optimal regarding occupied chip area and consumption of power.

Hence, there is the need for improved SIMO- or antenna diversity receiver concepts allowing for reduced chip area and reduced power consumption.

SUMMARY OF THE INVENTION

Embodiments of the present invention provide an apparatus for providing a baseband signal for exploiting receive antenna diversity by means of a digital baseband processor. The apparatus includes a combiner configured to temporally alternately select at least one sample of a first received signal corresponding to a first receive antenna and at least one sample of a second received signal corresponding to a second receive antenna and to interleave the selected samples of the first and second received signal to obtain a temporally continuous stream of samples of a baseband representation of a combined signal at an output of the combiner as the baseband signal for exploiting receive antenna diversity.

BRIEF DESCRIPTION OF THE DRAWINGS

Embodiments of the present invention will be explained in more detail in the following with respect to the accompanying drawings, in which:

FIG. 2b shows a block diagram of an apparatus for providing a baseband signal for exploiting receive antenna diversity according to a further embodiment of the present invention;

FIG. 8a shows an apparatus for exploiting receive antenna diversity including a first and a second combiner together with a selector for selecting between the two combiners according to an embodiment of the present invention; and FIG. 8b shows a more detailed block diagram of the apparatus according to FIG. 8a.

DETAILED DESCRIPTION OF ILLUSTRATIVE EMBODIMENTS

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using some non-limiting example applications, the technology may be employed to many types of communications systems. In some instances, detailed descriptions of well known methods, interfaces, circuits, and devices are omitted so as not to obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

During the following specification, lower-case bold face variables (a, b, c, . . . ) are used to denote vectors and upper-case bold face variables (A, B, C, . . . ) are used to denote matrices.

Figure 1A:
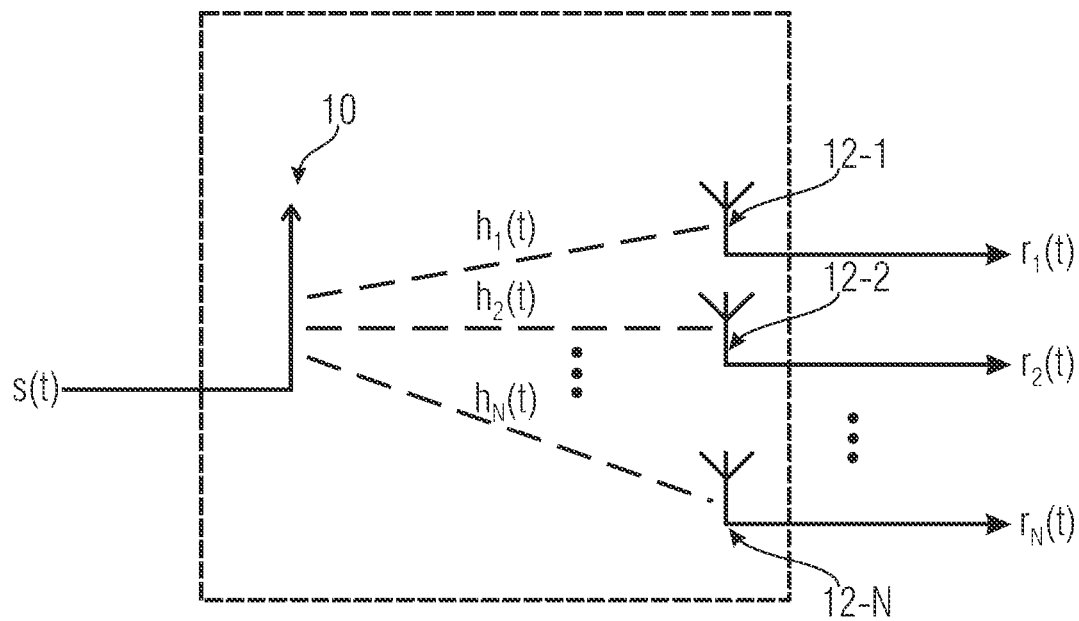
FIG. 1a schematically shows a SIMO-channel model.
Figure 1B:
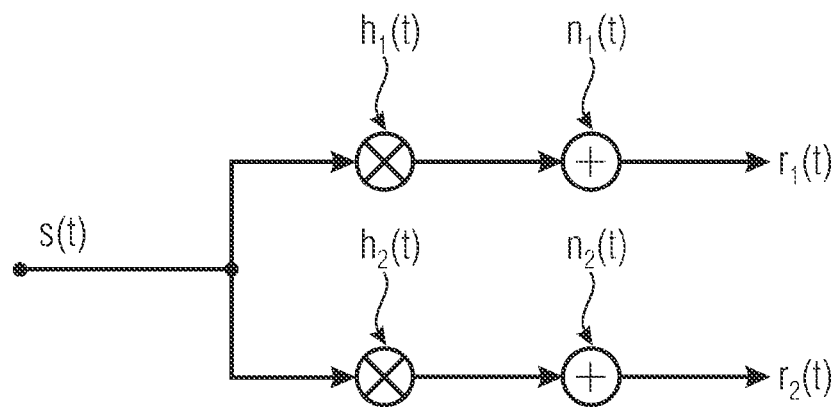
FIG. 1b shows a block diagram of a 1×2 SIMO-channel model.

To achieve a better performance in a mobile communication system antenna diversity is a well-known method for improving link performance. FIG. 1a schematically shows a 1×N SIMO-channel model, wherein a transmit signal s(t) is transmitted by means of a transmit antenna 10 to a plurality of receive antennas 12-1, 12-2, . . . , 12-N via a plurality of mobile fading channels $h_1(t)$, $h_2(t)$, . . . , $h_N(t)$. Assuming sufficient mutual distances or different polarizations between the N receive antennas at the receiver, the corresponding N fading channels may be assumed to fade statistically independently from each other.

Assuming, as a non-limiting example, N=2 receive or RX antennas at a receiver, e.g., a mobile station (MS), the two corresponding received signals $r_1(t)$ and $r_2(t)$ may be written according to:

$$r_1(t) = h_1(t)s(t) + n_1(t), \quad (1)$$

$$r_2(t) = h_2(t)s(t) + n_2(t), \quad (2)$$

in equivalent complex baseband notation, wherein $h_1(t)$ denotes the complex-valued channel coefficient of the first fading channel from the transmit antenna 10 to the first RX antenna 12-1, and wherein $h_2(t)$ denotes the complex-valued channel coefficient of the second fading channel from the transmit antenna 10 to the second RX antenna 12-2. In case of non-dispersive, i.e., frequency-flat fading channels $h_1(t)$ and $h_2(t)$ may denote Rayleigh- or Rice distributed random variables. $n_1(t)$ and $n_2(t)$ denote additive white Gaussian noise (AWGN), respectively. Using $r(t)=(r_1(t), r_2(t))^T$, $h(t)=(h_1(t), h_2(t))^T$ and $n(t)=(n_1(t), n_2(t))^T$, Eqs. (1) and (2) may be rewritten according to:

$$r(t)=h(t)s(t)+n(t) \qquad (3)$$

in vector notation. Throughout the following specification N=2 RX antennas at a receive terminal will be assumed for purposes of clarity. Of course, embodiments may easily be extended to more than two RX antennas.

Typically, antenna diversity means that multiple receivers are used, resulting in additional cost. Until now RF- and baseband parts of a diversity receiver usually are designed for antenna diversity by copying a complete receiver path (from the antenna to an inner receiver output) at least a second time. This, of course, results in additional cost. At an output of both receive paths the signals are combined to achieve improved performance. This includes potential baseband combining techniques in the inner receiver, like, e.g., joint equalization of a multitude of received signals. This results in a better reception, since one gets an antenna gain (i.e., the receiver can catch more energy) and/or a diversity gain (depending, e.g., on the distance or the polarization of the RX antennas. There are also other solutions that do not need two receivers, like, e.g., hard switching to the RX antenna experiencing the best reception conditions. This is typically referred to as selection combining. However, the performance of selection combining does not match the performance of full diversity solutions as only the receive power of one RX antenna is used and the energy received by the other antenna(s) is lost. Therefore, until now there was only the choice to either do full receive diversity or to have a low performing antenna selection diversity with one RF- and one baseband (BB) receiver.

Embodiments of the present invention allow for a diversity concept which can do antenna diversity using a diversity RF integrated circuit (IC) with multiple RX paths. However, a baseband part of the receiver only has a single receiver path, as the baseband IC is not explicitly designed for antenna diversity operation. Hence, the antenna diversity operation may be done without having an additional diversity signal path in the baseband and the RF-BB interface and with only little control overhead.

Figure 2A:
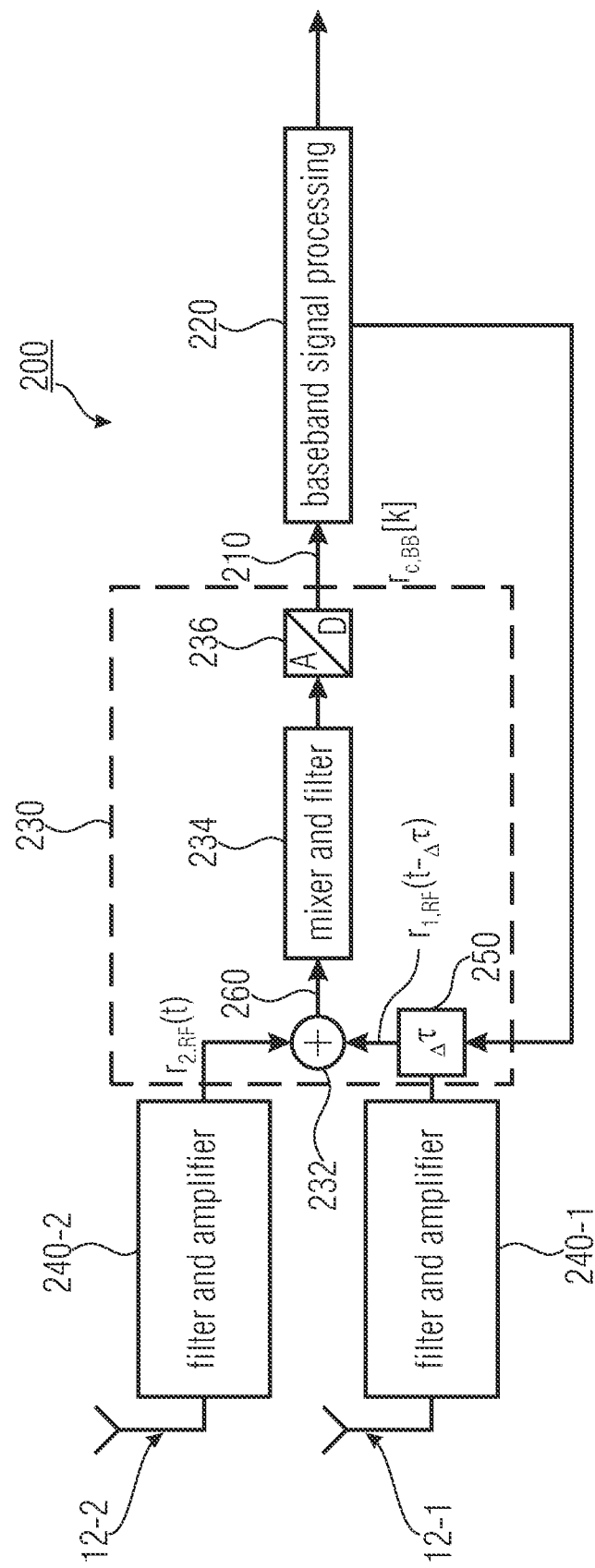
FIG. 2a shows a block diagram of an apparatus for providing a baseband signal for exploiting receive antenna diversity according to an embodiment of the present invention.

Turning now to FIG. 2a, a schematic block diagram of a first embodiment of the present invention is illustrated.

FIG. 2a shows an apparatus 200 for providing a baseband signal 210 for exploiting receive antenna diversity by means of a digital baseband processor 220. The apparatus 200 comprises a combiner 230 configured to temporally delay a first received signal $r_1(t)$ corresponding to a first receive antenna 12-1 with respect to a second receive signal $r_2(t)$ corresponding to a second receive antenna 12-2. The combiner 230 is further configured to add the delayed first received signal $r_1(t-\Delta\tau)$ and the second received signal $r_2(t)$ to obtain a baseband representation of a combined signal $r_c(t)$ at an output of the first combiner 230 as the baseband signal 210 for exploiting the receive antenna diversity.

Hence, the apparatus 200 is configured, according to embodiments, to convert spatial diversity into multipath diversity. For example, in case of individual flat fading channels $h_n(t)$ (n=1, . . . , N; N≥2), the apparatus 200 or the combiner 230 generates, at its output, an artificial dispersive or frequency-selective channel with an impulse response:

$$h_c(t) = \sum_{n=1}^{N} h_n(t)\delta(t - \Delta\tau_n), \qquad (4)$$

wherein $\delta(\bullet)$ denotes the Dirac-function and $\Delta\tau_n$ denotes the delay of the n-th received signal $r_n(t)$.

As indicated by FIG. 2a, the combiner 230 may be configured to temporally delay the first received signal and to combine the delayed first received signal and the second received signal in the analog RF-signal domain. Both RF-receive branches include filter and amplifier stages 240-1, 240-2, respectively, which are used for band-pass filtering and low-noise amplification of RF received signals $r_{1,RF}(t)$ and $r_{2,RF}(t)$. Downstream to the filter- and amplifier-stage 240-1, the first received RF-signal $r_{1,RF}(t)$ is temporally delayed by $\Delta\tau$ seconds by means of a temporal delay means 250, such as, e.g., a delay line. The delayed first RF-signal $r_{1,RF}(t-\Delta\tau)$ and the second RF signal $r_{2,RF}(t)$ are then added or combined to a combined RF signal $r_{c,RF}(t)$ 260 by means of a signal adding stage 232. The combined analog RF-signal $r_{c,RF}(t)$ 260 is then down-converted and low-pass filtered by a mixer and low-pass filter 234. The resulting analog baseband signal $r_{c,BB}(t)$ at the output of block 234 is then analog-to-digital-converted by means of an ADC (Analog-to-Digital Converter) 236 to obtain a digital baseband representation of the combined signal $r_{c,BB}[kT]$ or $r_{c,BB}[k]$ at the output of the combiner 230 as the baseband signal 210 for exploiting receive antenna diversity. Here, 1/T denotes the sampling frequency of ADC 236 which will typically correspond to a transmit symbol rate.

Due to delaying the first received signal $r_{1,RF}(t)$ by $\Delta\tau$, RX antenna diversity is artificially converted into multipath diversity. That is, a plurality of non-dispersive communications channels $h_n(t)$ (n=1, . . . , N; N≥2) are artificially converted into one dispersive communications channel $h_c(t)$, or a plurality of dispersive communications channels $h_n(t)$ (n=1, . . . , N; N≥2) are artificially converted into one even more dispersive communications channel $h_c(t)$. Hence, the combined signals $r_{c,RF}(t)$ 260 and/or $r_{c,BB}[k]$ 210 look to the digital baseband processor 220 like a signal which has been transmitted from one transmit antenna 10 to a single receive antenna over a frequency selective mobile fading channel. As has been explained before, additional inter-symbol-interferences (ISI) are artificially introduced to the combined signal $r_{c,RF}(t)$ 260 and/or $r_{c,BB}(t)$ due to the delay $\Delta\tau$ of the first received signal $r_{1,RF}(t)$. For this reason, the digital baseband processor 220 may be configured to process the baseband representation of the combined signal $r_{c,BB}(t)$ as a receive signal with temporal ISI corresponding to a transmission of a transmit signal over the artificial dispersive communications channel $h_c(t)$.

According to some embodiments, the digital baseband processor 220 may be configured as a Rake receiver. A Rake receiver is a radio receiver designed to counter the effects of multipath fading. It does this by using several "sub-receivers" called Rake-fingers, i.e., several correlators each assigned to a different multipath component of $h_c(t)$. Each Rake-finger independently decodes a single multipath component. At a later stage the contribution of all Rake-fingers are combined in order to make the most use of the different transmission characteristics of each transmission path. This may very well result in higher signal-to-noise ratio (SNR) in a multipath environment than in a non-dispersive environment. In summary, RX diversity may, hence, be exploited. In case there are more multipath components of $h_c(t)$ than Rake fingers the Rake receiver may select the strongest multipath components of $h_c(t)$ for further processing, such as Maximum-Ratio Combining (MRC) of the contributions of the Rake-fingers. Typically, at least one of a plurality of Rake fingers of the Rake receiver will be dedicated to the delayed first received signal $r_1(t-\Delta\tau)$ and at least a second Rake finger will be dedicated to the second received signal $r_2(t)$. A Rake receiver may, in particular, be used as the digital baseband processor 220 in case of Code Division Multiple Access (CDMA) transmission schemes.

According to further embodiments of the present invention, the digital baseband processor 220 may also be configured as a linear or nonlinear channel equalizer in order to exploit the artificially introduced multipath diversity of the combined signal $r_{c,BB}(t)$ 210. Examples for linear channel equalizes are the linear zero-forcing (ZF) equalizer or the linear minimum mean squared error (MMSE) equalizer. Well-known nonlinear channel equalizers are decision feedback equalizers (DFE) or various types of maximum-likelihood sequence estimators (MLSE), which do not need to be detailed here. For decision feedback or reduced-state equalization schemes often pre-filters are used to generate an equivalent minimum-phase channel having its energy in the first channel taps. Hence, in such a case the pre-filters will concentrate the energy of all communications channels $h_n(t)$ (n=1, . . . , N; N≥2), leading to diversity gain. Depending on the sample rate of the combined signal $r_{c,BB}$ with respect to a transmit symbol duration T, the equalizers may also be configured as so-called fractional equalizers. In case of a combined baseband signal $r_{c,BB}$ with two-fold oversampling, T/2-spaced equalizers may be employed in the digital baseband processor 220.

For practical equalization schemes, the digital baseband processor 220 needs to have knowledge of the channel coefficients $h_n(t)$ (n=1, . . . , N; N≥2) as channel state information (CSI). For this reason, the digital baseband processor 220 may be configured to estimate, based on the baseband representation of the combined signal $r_{c,BB}[k]$ 210 and based on known pilot symbols at known pilot symbol positions, the channel coefficients $h_n(t)$ (n=1, . . . , N; N≥2) of the communications channels over which the plurality of received signals $r_n(t)$ (n=1, . . . , N; N≥2) have been transmitted, respectively. Applying well-known channel estimators, such as, e.g., Wiener-filters or least-mean squared error (LMSE) filters to the combined signal $r_{c,BB}(t)$ 210 will "automatically" lead to the channel estimates corresponding to the multipath-components $h_n(t)$ (n=1, . . . , N; N≥2) of the artificially generated multipath channel $h_c(t)$. Hence, according to embodiments, conventional single-antenna baseband receivers 220 may be employed for exploiting RX antenna diversity.

A diversity gain which may be achieved with embodiments, is also dependent on a distance or polarity of the employed RX antennas. While closely spaced receive antennas (distance between antennas approximately half a wavelength λ of the RF-signal) are good for beam-forming techniques, spatial or RX diversity may be achieved with RX antennas which are placed either far enough from each other or are differently polarized, such that fading characteristics of a communications channel corresponding to a first received signal are independent from fading characteristics of a communications channel corresponding to a second received signal. That is, for exploiting spatial or RX diversity the first and second communications channels have to be (essentially) uncorrelated. This may be achieved when applying RX antenna distances larger than 0.5λ or RX antennas with different polarizations.

While FIG. 2a depicts an embodiment for exploiting receive antenna diversity or spatial diversity, wherein the delayed first received signal and the second received signal are combined in the analog RF-signal domain, FIG. 2b shows an embodiment 270, wherein the delayed first received signal and the second received signal are combined in the digital baseband signal domain.

According to FIG. 2b, the first and second received RF-signals $r_{1,RF}(t)$, $r_{2,RF}(t)$ are first band-pass filtered, low-noise amplified and down-converted using circuit blocks 280-1 and 280-2, respectively. The resulting analog baseband signals $r_{1,BB}(t)$, $r_{2,BB}(t)$ are then analog-to-digital-converted using the ADCs 236-1 and 236-2, respectively. Then, the first received digital baseband signal $r_{1,BB}[kT]$ is delayed by $\Delta\tau$ by means of delay element 250 in order to obtain a delayed first received digital baseband signal $r_{1,BB}[kT-\Delta\tau]$. This delayed first received signal $r_{1,BB}[kT-\Delta\tau]$ is then added to the digital baseband representation of the second received signal $r_{2,BB}[kT]$ using adder 232 to obtain the digital baseband representation of the combined signal $r_{c,BB}[kT]$ 210 at an output of the combiner 230. Again, the baseband representation of the first combined signal $r_{c,BB}[kT]$ 210 may be processed by the single-antenna digital baseband processor 220, as has been explained above. Hence, according to FIG. 2b, the combiner 230 is configured to add the delayed first received signal to the second received signal in the digital (baseband) domain.

It is important that the delay $\Delta\tau$ is adjusted in such a way that individual multipath components, i.e., signal echoes, of the first and second received signal $r_1(t)$, $r_2(t)$ do not interfere with each other. For this reason, be it in the analog or digital signal domain, the combiner 230 is configured to delay the first received signal $r_1(t)$ such that a signal echo of the first received signal due to a multipath propagation does not temporally interfere with a signal echo of the second received signal. This shall be explained in more detail referring to FIGS. 3a and 3b.

Figure 3A:
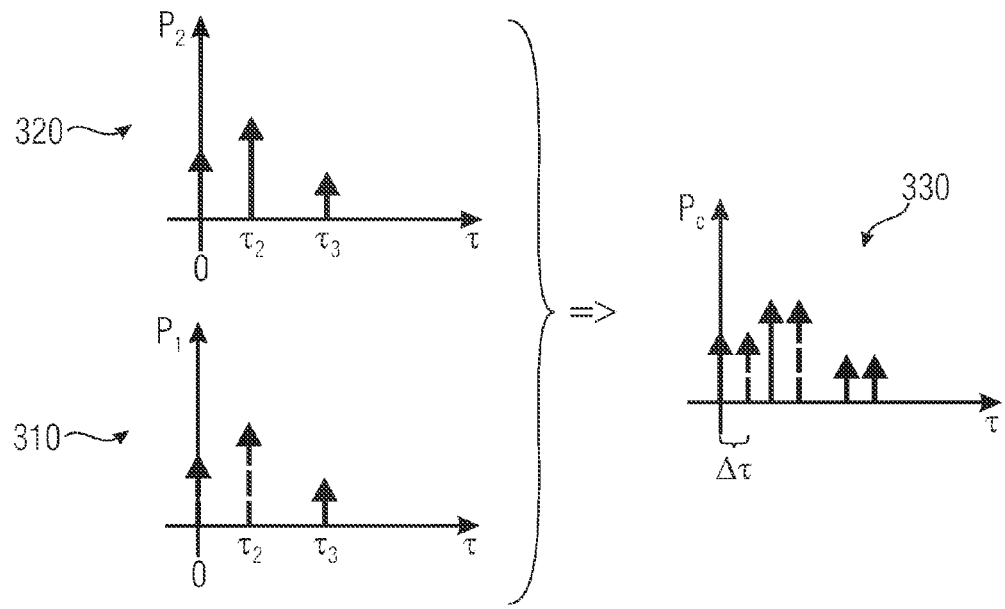
FIG. 3a shows a combination of two channel power-delay profiles to a combined power-delay profile according to an embodiment of the present invention.

FIG. 3a depicts two identical power-delay profiles 310 and 320 corresponding to frequency-selective mobile fading channels "seen" by the first 12-1 and second RX antenna 12-2, respectively. As indicated by FIG. 3a, the delay element 250 may be adapted to delay the first received signal $r_1(t)$, such that a power delay profile 330 corresponding to the virtual dispersive communications channel $h_c(t)$ is an interleaved version of the first and second power delay profiles 310 and 320. Thereby, the delay $\Delta\tau$ is chosen such that no multipath components temporally overlap.

Figure 3B:
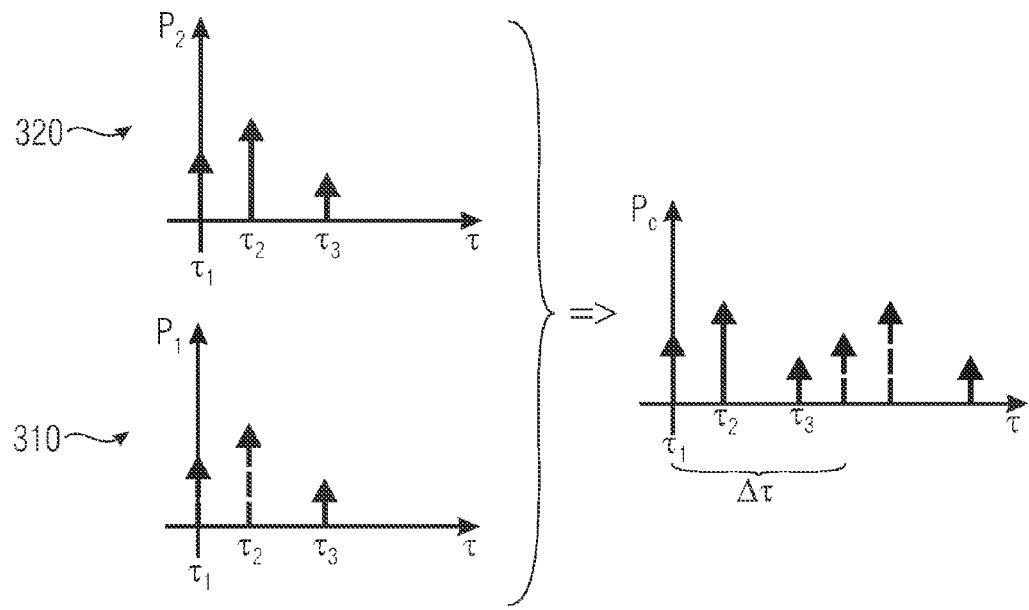
FIG. 3b shows a combination of two power-delay profiles to a combined power-delay profile according to a further embodiment of the present invention.

FIG. 3b illustrates a further option for choosing the delay $\Delta\tau$. According to FIG. 3b, the combiner 230 is configured to delay the first received signal $r_1(t)$ such that a temporal delay $\Delta\tau$ of the delayed first received signal $r_1(t-\Delta\tau)$ is larger than a delay spread of a communications channel $h_2(t)$ over which the second received signal $r_2(t)$ has been transmitted. Thereby, delay spread is a measure of distortion that is caused when an identical signal arrives at different times at its destination. The signal usually arrives at the RX antennas via multiple paths and with different angles of arrival. The time difference between the arrival moment $\tau_1$ of the first multipath component (typically the line-of-sight component) and the last one (here: $\tau_3$), is called delay spread ($\tau_3-\tau_1$). That is, if, e.g., we have multipath delays of $\tau_1=0$ μs, $\tau_2=2$ μs and $\tau_3=3$ μs, and assuming that the multipath delays are the same for both RX antennas, the delay $\Delta\tau$ should not be chosen to 1, 2 or 3 μs, since in these cases a diversity multipath of the first received signal $r_1(t)$ would interfere with a multipath component seen by the second RX antenna. A delay adjustment may be adapted by the digital baseband processor only in case such a multipath interference or crash is happening. By choosing a relatively large initial delay $\Delta\tau$, like, e.g., $\Delta\tau=5$ µs, an adaptation of the delay $\Delta\tau$ is quite unlikely, since most relevant radio propagation channels have a smaller delay spread.

For time division multiple access (TDMA) communications schemes, like, e.g., GSM/EDGE (Enhanced Data Rates for GSM Evolution), the delay $\Delta\tau$ could also be chosen equal to a duration of a time slot or a multiple thereof. In this case the delayed received signal could be processed by the digital baseband processor 220 in a subsequent timeslot of a TDMA frame. Thereby no additional signal echoes would have to be processed by the digital baseband processor 220 (in the same timeslot), relieving hardware and computing requirements.

Embodiments of the present invention also include a method for providing the baseband signal 210 for exploiting receive antenna diversity by means of a digital baseband processor 220.

Figure 4:
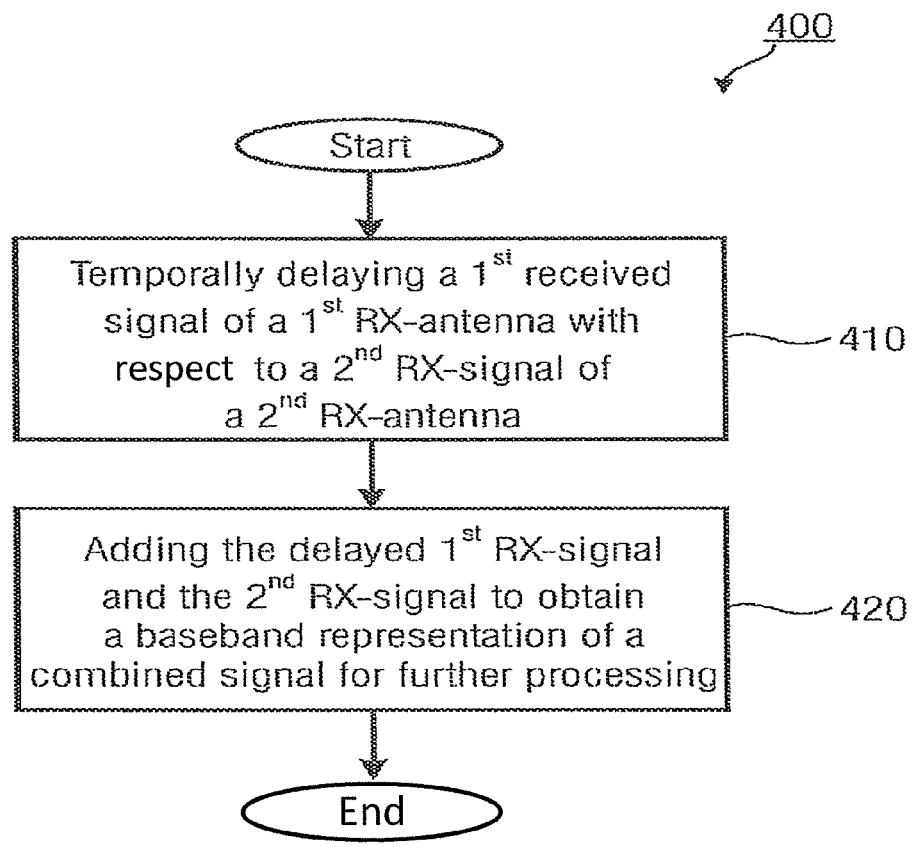
FIG. 4 schematically shows a flow chart of a method for providing a baseband signal for exploiting receive antenna diversity according to an embodiment of the present invention.

A method 400 according to an embodiment is schematically illustrated in the flow-chart of FIG. 4.

The method 400 comprises a first step 410 of temporally delaying the first received signal $r_1(t)$ corresponding to the first receive antenna 12-1 with respect to the second received signal $r_2(t)$ corresponding to the second receive antenna 12-2. Further, the method 400 comprises a second step 420 of adding the delayed first received signal $r_1(t-\Delta\tau)$ and the second received signal $r_2(t)$ to obtain a baseband representation of the combined signal $r_c(t)$ as the baseband signal 210 for exploiting the receive antenna or spatial diversity.

With respect to FIGS. 5a-7, a further aspect of the present invention will now be explained in the following.

Figure 5A:
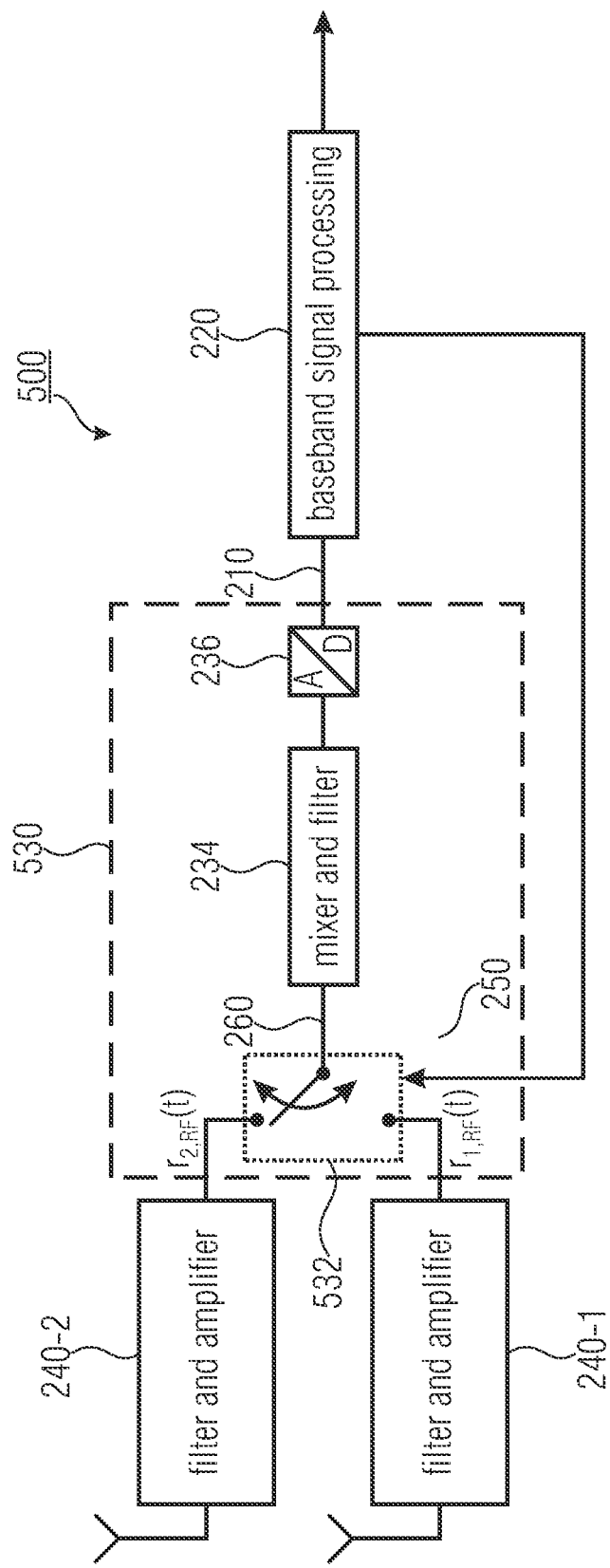
FIG. 5a shows yet a further embodiment of an apparatus for providing a baseband signal for exploiting receive antenna diversity.

FIG. 5a shows an apparatus 500 for providing a baseband signal 210 for exploiting spatial or receive antenna diversity by means of the digital baseband processor 220.

The apparatus 500 includes a combiner 530 configured to temporally alternately select at least one sample of a first received signal $r_1(t)$ corresponding to the first receive antenna 12-1 and at least one sample of a second received signal $r_2(t)$ corresponding to the second receive antenna 12-2 and to interleave the selected samples of the first and second received signals $r_1(t)$, $r_2(t)$ to obtain a temporally continuous stream of samples of a baseband representation of a combined signal $r_c(t)$ at an output of the combiner 530 as the baseband signal 210 for exploiting the receive antenna diversity.

The combiner 530 of FIG. 5a, hence differs from the combiner 230 in the actually employed combining means 532. The combining means 532 of combiner 530 may be implemented, e.g., as a switch for alternately switching between the first and the second received signals $r_1(t)$, $r_2(t)$. A switching time $T_s$ of the switch 532 may be configured by the digital baseband processor 220, e.g., in response to the number N of RX antennas.

As has already been explained with reference to FIG. 2a, the first and the second received signal $r_1(t)$, $r_2(t)$ may, according to an embodiment, be combined in the analog signal domain before converting the combined signal $r_c(t)$ to the digital baseband signal domain. This option is shown by FIG. 5a, where it is switched between the first and the second received RF signal $r_{1,RF}(t)$, $r_{2,RF}(t)$ to obtain an analog combined RF signal $r_{c,RF}(t)$ 260 before converting the combined RF signal $r_{c,RF}(t)$ to digital baseband signal $r_{c,BB}[k]$ 210.

Figure 5B:
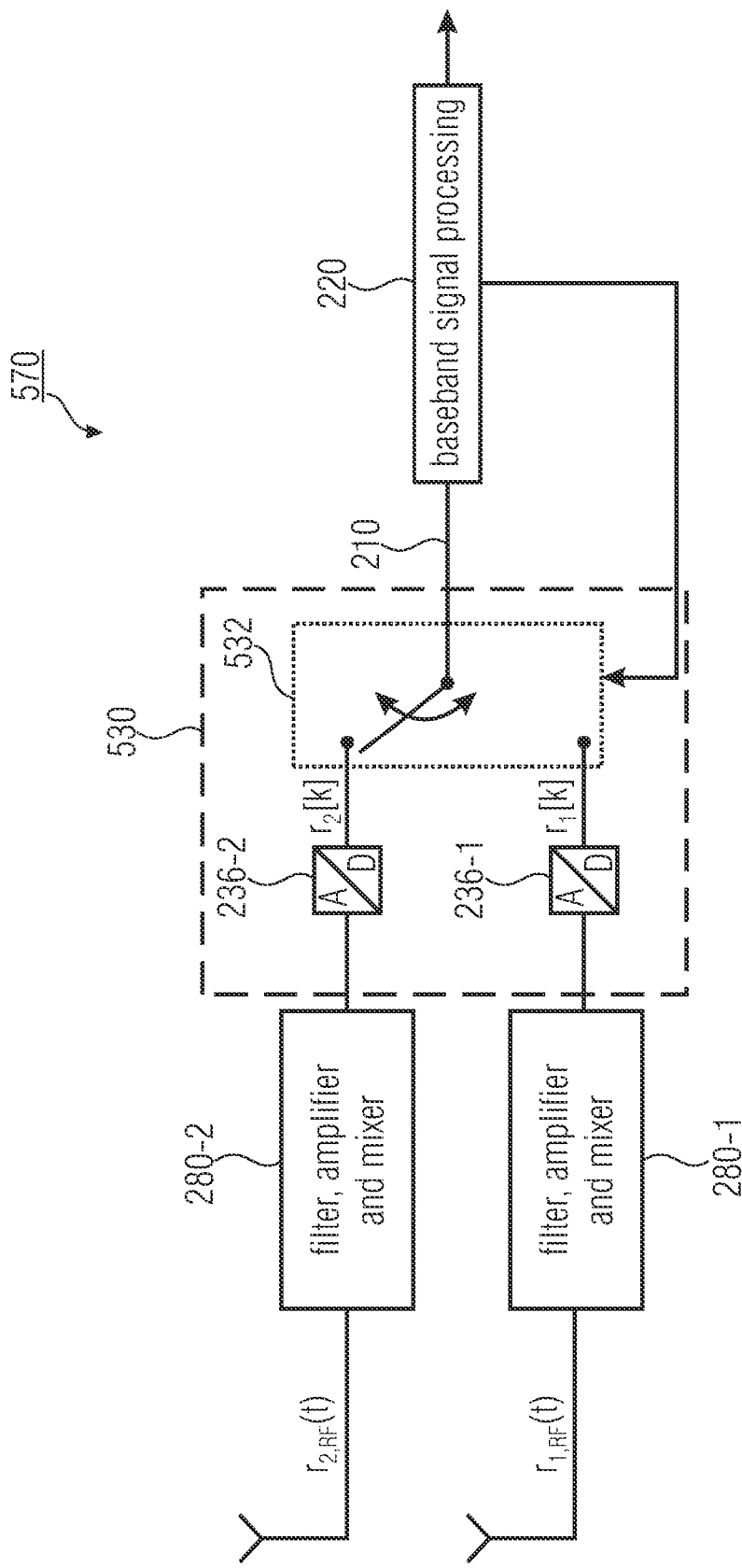
FIG. 5b shows an additional embodiment of an apparatus for providing a baseband signal for exploiting receive antenna diversity.

A further option is to combine, i.e., to switch between the first and second received signal $r_1(t)$, $r_2(t)$ in the digital baseband signal domain, which has similarly already been explained with reference to FIG. 2b. This combining method is illustrated in FIG. 5b, whereas the combiner 530 is configured to temporally alternately select at least one sample of the first received digital BB signal $r_{1,BB}[k]$ and at least one sample of the second received digital BB signal $r_{2,BB}[k]$ by using switch 532. Thus, a temporally continuous stream 210 of interleaved samples of the first and second received signal is obtained at the output of the combiner 530. In general, for N RX antennas, this means that combiner 530 is configured to first select at least one sample of the first received signal $r_1$ before selecting at least one sample of the second received signal $r_2$. After that, at least one sample of a third received signal $r_3$ is selected, etc. Then, after at least one sample of an N-th received signal $r_N$ has been selected, combiner 530 switches back to again select at least one sample of the first received signal $r_1$, and so on. Hence, the at least one sample of each received signal $r_1$, (n=1, ..., N) is selected periodically, respectively.

In the following, although not intended to limit the scope of the present invention, embodiments with N=2 RX antennas will be described in more detail.

According to an embodiment with N=2 RX antennas, the samples of the first received signal $r_{1,BB}[m]$ and samples of the second received signal $r_{2,BB}[m]$ may each be sampled with a receive sample rate twice a transmit symbol rate 1/T. That is, the received signals $r_{1,BB}[m]$, $r_{2,BB}[m]$ may be oversampled with an oversampling ratio of N=2. In UMTS (Universal Mobile Telecommunications System), e.g., the transmit symbol rate is 3.84 MChips/s. Two-fold oversampling yields receive sample rates of 7.68 MChips/s, respectively.

Figure 6A:
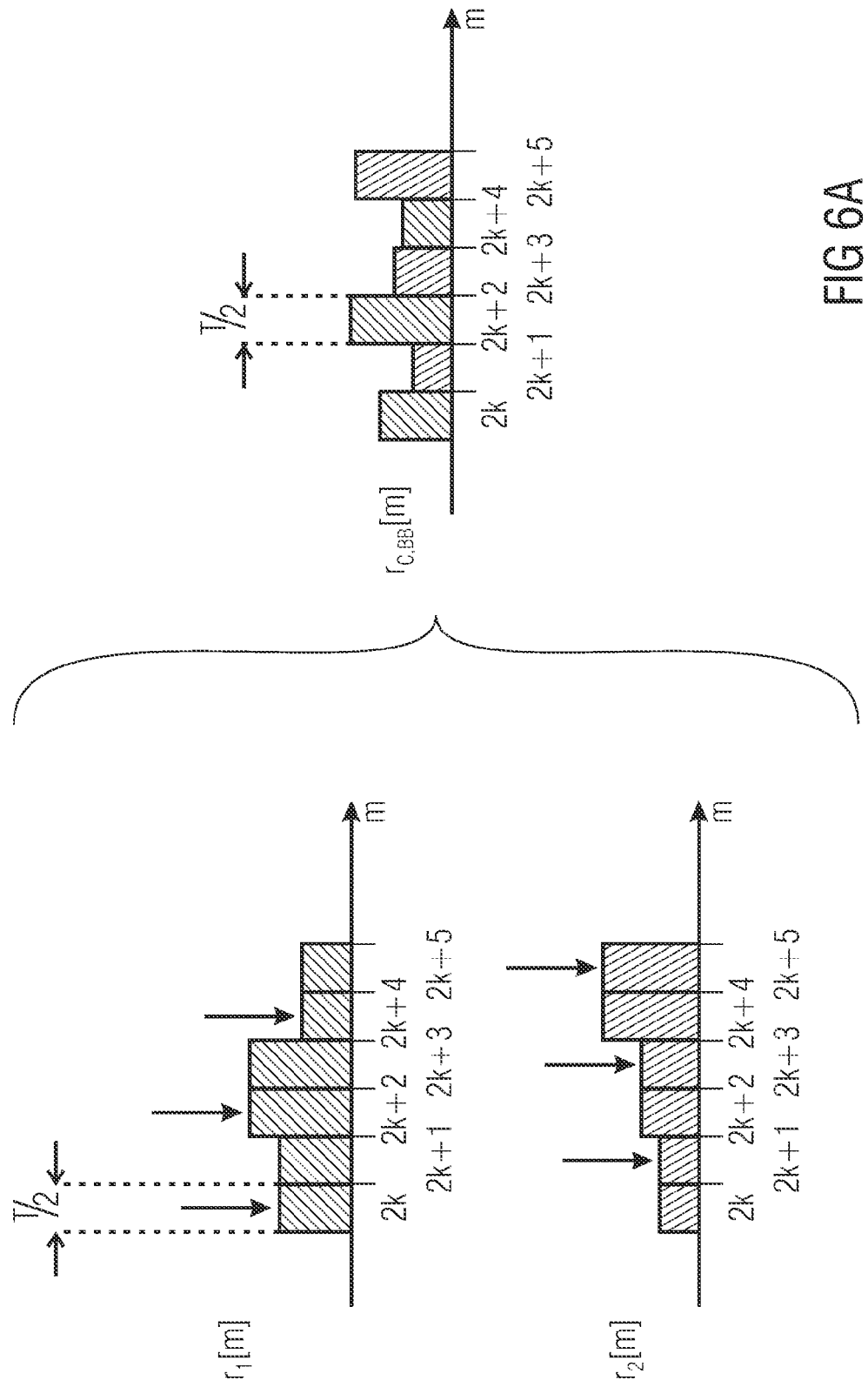
FIG. 6a schematically illustrates a temporally alternate selection of samples of a first received signal and samples of a second received signal according to an embodiment of the present invention.

As illustrated in FIG. 6a the combiner 530 may be configured to alternately select one sample $r_{1,BB}[2k]$ of the first received signal and one sample $r_{2,BB}[2k+1]$ of the second received signal, again one sample $r_{1,BB}[2k+2]$ of the first received signal and one sample $r_{2,BB}[2k+3]$ of the second received signal, etc., wherein durations of the individual selected samples corresponds to half a transmit symbol duration (T/2) due to the two-fold oversampling. Hence, the combiner 530 may, e.g., select all even numbered samples from the first received signal and all odd numbered samples from the second received signal and interleave the selected samples of the first and second received signals such that a sample rate of the combined signal $r_{c,BB}[m]$ 210 again corresponds to the respective receive sample rates. Hence, the combined signal $r_{c,BB}[m]$ comprises N=2 subsequent samples $r_{1,BB}[2k]$, $r_{2,BB}[2k+1]$ from different RX antennas, however, the subsequent samples both corresponding to the k-th transmit symbol interval.

According to a further embodiment with N=2 RX antennas, it is assumed that samples of the first received signal $r_{1,BB}[k]$ and samples of the second received signal $r_{2,BB}[k]$ are each sampled with a receive sample rate being equal to the transmit symbol rate 1/T. Such a sample rate could, e.g., also result from downsampling oversampled received signals to transmit symbol rate by appropriate digital filtering, respectively. In this case the combiner 530 may be configured to alternately select one sample of the first received signal $r_{1,BB}[k]$ and one sample of the second received signal $r_{2,BB}[k]$ such that sample rates of the first and second received signal are one half of the sample rate of the temporally continuous stream of samples of the combined signal $r_{c,BB}[m]$ 210 or, to put it another way, such that the sample rate of the combined signal $r_{c,BB}[m]$ 210 is twice the sample rates of the first and second received signal, respectively. In general, the sample rates of N received signals $r_{n,BB}[k]$ (n=1, 2, ..., N) may correspond to the N-th fraction of the sample rate of the combined signal $r_{c,BB}[m]$ 210. That is, within one symbol time interval T of the k-th symbol, a sample of each received signal $r_n[k]$ (n=1, 2, ..., N) corresponding to the n-th RX antenna is selected. The selected N samples (or sub-samples) are then parallel-to-serial converted to obtain the temporally continuous stream of samples of the combined signal $r_{c,BB}[m]$ 210. The resulting N sub-samples corresponding to the k-th transmit symbol interval consequently have a duration of T/N, respectively. The N sub-samples corresponding to symbol k are arranged subsequently in a temporally continuous stream of sub-samples forming the combined signal 210. That is, each sample of a received signal $r_n[k]$ (n=1, 2, ..., N) leads to N sub-samples corresponding to symbol k in the combined signal 210. For N=2 RX antennas this shall be explained in more detail with reference to FIG. 6b.

Figure 6B:
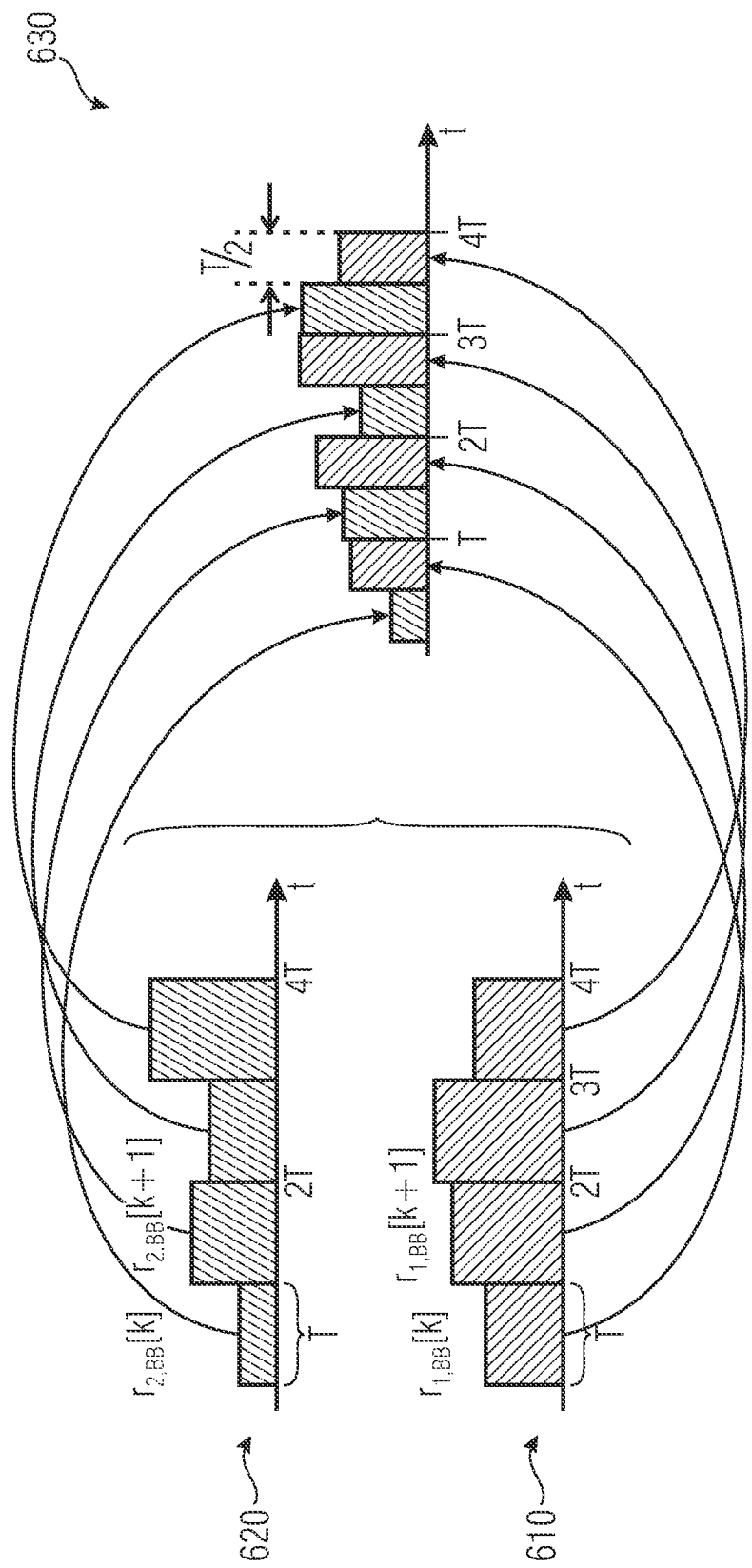
FIG. 6b schematically illustrates a temporally alternate selection of samples of a first received signal and samples of a second received signal according to a further embodiment of the present invention.

FIG. 6b shows two sequences 610 and 620 of samples corresponding to the first and second received signal, respectively. Thereby, a sample $r_{n,BB}[k]$ (n=1, 2) of the sample sequences 610, 620 has a duration T, which may, e.g., correspond to a symbol duration of a transmit symbol. Hence, the sample rate of the first and second sample sequences 610, 620 is 1/T, respectively. Now the switching time $T_s$ of switch 532 is adjusted to $T_s$=T/2. Thereby, the switch 532 may also be interpreted as a parallel-to-serial converter. That is, for a time period of $T_s$=T/2 switch 532 selects a first sample $r_{2,BB}[k]$ of sample sequence 620. Then, after T/2, switch 532 selects a first sample $r_{1,BB}[k]$ of sample sequence 610. Then, at time T, switch 532 switches back to sampling sequence 620 to select a second sample $r_{2,BB}[k+1]$ of sequence 620. Half a transmit symbol period later, i.e., at 3T/2, switch 532 switches back to the first received signal in order to select a second sample $r_{1,BB}[k+1]$ of sample sequence 610, and so on. Hence, the resulting temporally continuous stream $r_{c,BB}[m]$ of interleaved samples 630 has a sample rate of T/2. The first two sub-samples $r_{2,BB}[k]$, $r_{1,BB}[k]$ of sequence 630 correspond to the k-th symbol transmitted in the k-th symbol interval. The next two sub-samples $r_{2,BB}[k+1]$, $r_{1,BB}[k+1]$ in sequence 630 correspond to the (k+1)-th symbol transmitted in the (k+1)-th interval, etc. Hence, in this example with N=2:

$$r_{c,BB}[m=2k]=r_{2,BB}[k] \text{ and } r_{c,BB}[m=2k+1]=r_{1,BB}[k]. \quad (5)$$

Subsequent sub-samples m=2k, m=2k+1, ..., m=2k+N−1 obtained from different receive branches but corresponding to the same transmit symbol interval k may be regarded as polyphase components of an N-times over-sampled signal. In other words, the received signals $r_{n,BB}[k]$ (n=1, 2, ..., N) correspond to the temporally continuous combined signal stream $r_{c,BB}[m]$ split up into N equidistant sub-bands. These sub-bands are, compared to $r_{c,BB}[m]$, sub-sampled by a factor of N, so they are critically sampled.

Hence, in order to detect the transmitted signal s(t), the digital baseband processor 220 may, e.g., be configured as a fractionally-spaced linear or nonlinear equalizer or as a Rake receiver, wherein fractionally-spaced is to be understood with respect to the transmit symbol duration T. In the exemplary case of only two receive antennas, a T/2-spaced linear or non-linear MMSE equalizer may, e.g., be employed in the digital baseband processor 220. In order to exploit the RX antenna or spatial diversity, the equalizer coefficients of the fractionally spaced equalizer may have to be computed jointly. If the T-spaced approach is used, it is useful to choose alternate polyphases for each RX antenna, e.g., polyphase 1 for RX antenna 1, polyphase 2 for RX antenna 2, as has been explained with reference to FIGS. 6a and 6b. This method may avoid the worst case, where both RX antennas have a timing error of half a symbol. This diversity approach is interesting, because it requires exactly the same computations as a single-antenna T/2-spaced equalizer. It may therefore be used to enable RX diversity without even touching a conventional single RX antenna baseband receiver. For that purpose, the digital baseband processor 220 is supplied with a T-spaced signal from alternating RX antennas, instead of a T/2-spaced signal from one receive antenna. That is, the digital baseband processor 220 essentially is a conventional digital baseband processor having an input coupled to the output of the combiner 530 for processing the temporally continuous stream of samples of the baseband representation of the combined signal $r_{c,BB}[m]$ 210 as a receive signal stream corresponding to a single receive antenna.

For purposes of channel estimation the digital baseband processor 220 may be configured to estimate, based on samples or polyphase components $r_{c,BB}[m=2k+1]$ of the base band representation of the combined signal corresponding to the first received signal $r_{1,BB}[k]$, a channel coefficient $h_1[k]$ of a communications channel corresponding to the first received signal, and, based on samples or polyphase components $r_{c,BB}[m=2k]$ of the base band representation of the combined signal corresponding to the second received signal $r_{2,BB}[k]$, a channel coefficient $h_2[k]$ of a communications channel corresponding to the second received signal. The digital baseband processor 220 may also be configured to apply estimated channel coefficients $h_1[k]$, $h_2[k]$ of the first or second received signal to samples or polyphase components of the combined signal $r_{c,BB}[m]$ corresponding to the first or second received signal, respectively, in order to estimate a continuous stream of transmitted samples s[k].

Figure 7:
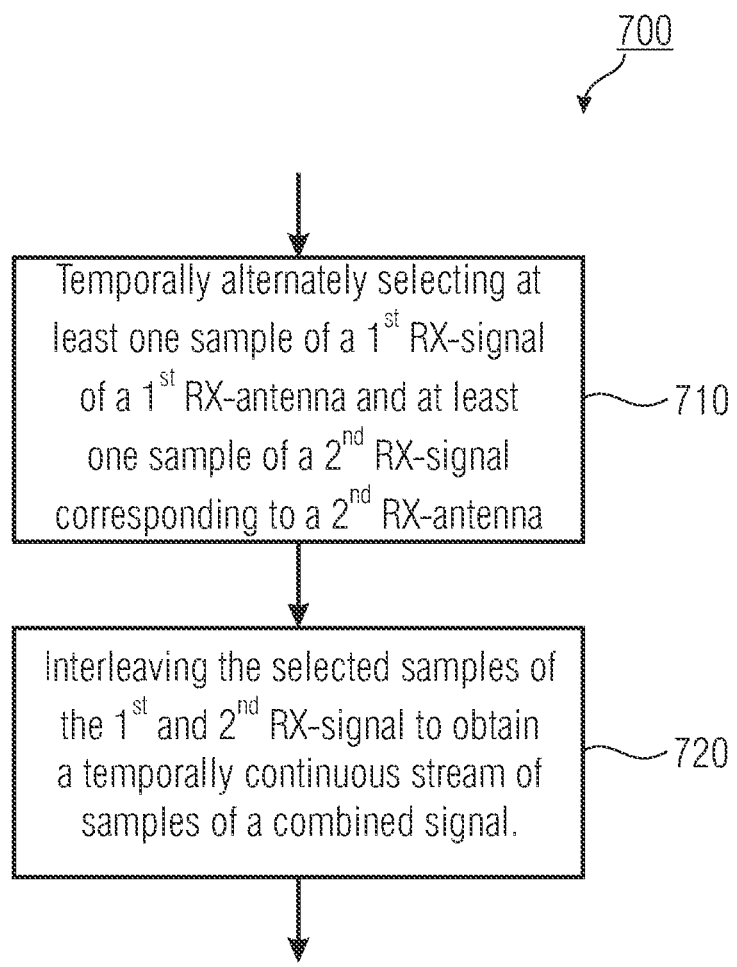
FIG. 7 schematically shows a flow chart of a further method for exploiting receive antenna diversity according to an embodiment of the present invention.

Further embodiments provide a further method for exploiting RX antenna diversity, which is schematically shown in FIG. 7.

Method 700 comprises a first step 710 of temporally alternately selecting at least one sample of a first received signal $r_1(t)$ corresponding to a first receive antenna and at least one sample of a second received signal $r_2(t)$ corresponding to a second receive antenna. Method 700 further comprises a second step 720 of interleaving the selected samples of the first and second receive signal $r_1(t)$, $r_2(t)$ to obtain a temporally continuous stream of samples of a combined signal $r_c(t)$ as the baseband signal 210 for exploiting receive antenna diversity.

Hence, in the embodiments described with reference to FIGS. 5-7, alternating samples from both receive branches are used, i.e., one sample from the first receive antenna and the next from the second receive antenna, the following sample again from the first receive antenna and then one from the second receive antenna and so on. This results in an average of the sum of the antennas, but with the difference, that the sampling rate per receive antenna is half of what was needed for a fractional spaced single antenna reception. The advantage is, that the digital baseband processor 220 gets information from both receive antennas separated and an equalizer may reconstruct the two receive signals resulting in a good diversity performance.

Embodiments of the present invention may also employ both of the combiners 230 and 530.

A decision whether to use first combiner 230 or second combiner 530 may be done adaptively depending on some channel estimation results. According to embodiments, both combiners 230 and 530 may be implemented together with a selector for selecting one of the two combiners 230 or 530, as shown in FIG. 8a.

FIG. 8a shows an apparatus 800 according to an embodiment of the present invention.

The apparatus 800 comprises a first combiner 230 configured to temporally delay a first received signal $r_1(t)$ corresponding to a first receive antenna 12-1 with respect to a second received signal $r_2(t)$ corresponding to a second receive antenna 12-2, and to add the delayed first received signal $r_1(t-\Delta\tau)$ and the second received signal $r_2(t)$ to obtain a baseband representation of a first combined signal $r_{c,1}(t)$ at an output of the first combiner 230. Further, the apparatus 800 comprises a second combiner 530 configured to temporally alternately select at least one sample of the first received signal $r_1(t)$ and at least one sample of the second received signal $r_2(t)$ and to interleave the selected samples of the first and second received signal to obtain a temporally continuous stream of samples of a second combined signal $r_{c,2}(t)$ at an output of the second combiner 530. Also, the apparatus 800 comprises a selector 810 configured to provide, based on an estimated signal quality of the first and/or the second received signal, a baseband representation of one of the first or the second combined signal $r_{c,1}(t)$, $r_{c,2}(t)$ as the baseband signal 210 for exploiting receive antenna diversity.

According to an embodiment, the selector 810 is configured to adaptively provide the first or the second combined signal as the baseband signal 210 for exploiting receive antenna diversity based on channel estimates corresponding to the first and/or the second received signal. The selector 810 may be configured to provide the first combined signal $r_{c,1}(t)$ as the baseband signal 210 for exploiting receive antenna diversity in case a significant signal echo of the first and/or the second received signal leading to ISI due to a multipath propagation is detected. That means, that the first combiner 230 may be preferred in case of significant delay spreads of involved frequency selective multipath fading channels.

The selector 810 may also be configured to provide the second combined signal $r_{c,2}(t)$ as the baseband signal 210 for exploiting receive antenna diversity in case of a high Doppler-spread of the first and/or the second received signal, wherein the high Doppler-spread indicates rapidly changing conditions of communications channels corresponding to the first and/or the second received signal. This may be, e.g., due to a fast moving mobile station. When a user (or reflectors in its environment) is moving, the user's velocity causes a shift in the frequency of the signal transmitted along each signal path. This phenomenon is known as Doppler shift. Signals travelling along different paths can have different Doppler shifts, corresponding to different rates of change in phase. The difference in Doppler shifts between different signal components contributing to a single fading channel tap is known as the Doppler spread. Channels with a large Doppler spread have signal components that are each changing independently in phase over time. Since fading depends on whether signal components add constructively or destructively, such channels have a very short coherence time.

Figure 8B:
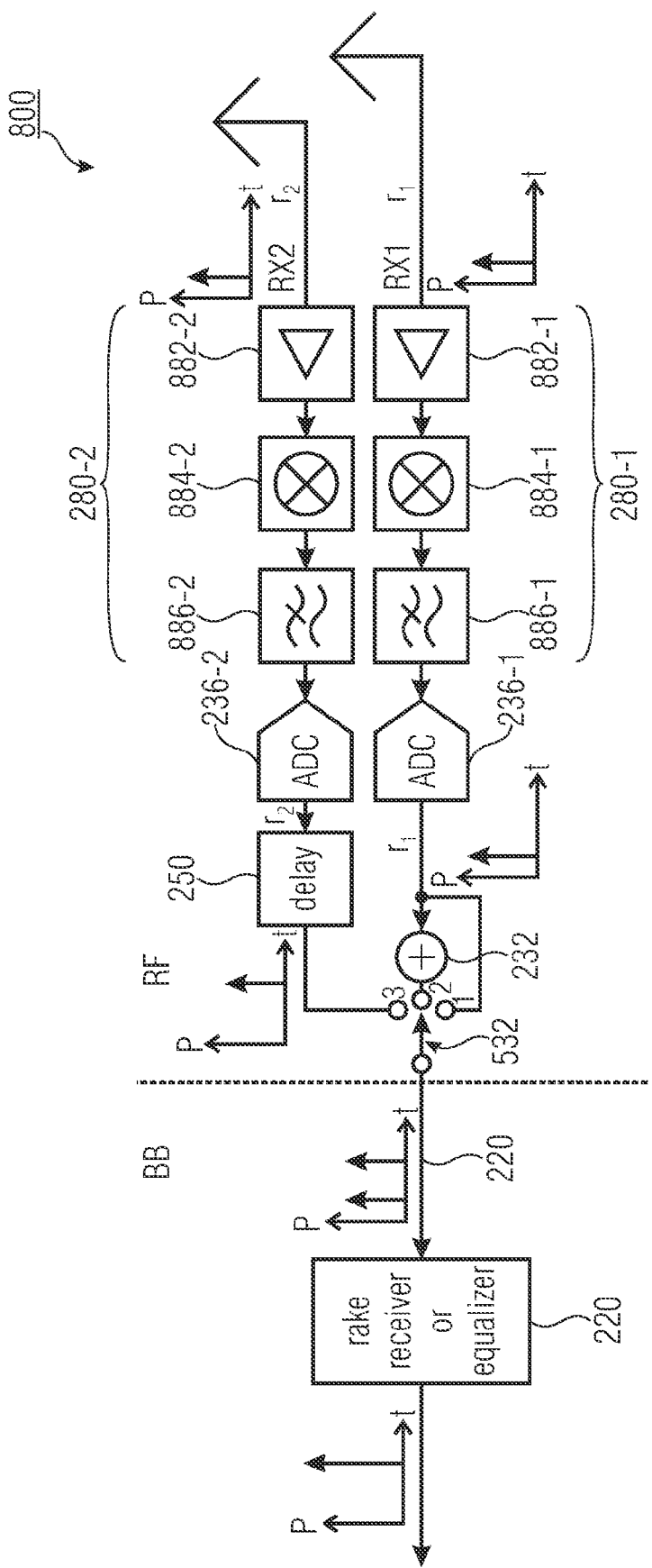

A more detailed block diagram of apparatus 800 is shown in FIG. 8b.

The received signals from the two receive branches RX1 and RX2 are amplified with LNAs 882, down converted with mixers 884 and low-pass filtered with low-pass filters 886, respectively. Then, the resulting analog baseband signals $r_{1,BB}(t)$ and $r_{2,BB}(t)$ are analog-to-digital-converted with ADCs 236 to obtain first and second digital baseband receive signals $r_{1,BB}[k]$ and $r_{2,BB}[k]$. Which of the described combination concepts is chosen depends on the position of switch 532, which may also be interpreted as the selector 810. If switch 532 is in position 2, the two received signals $r_{1,BB}[k]$ and $r_{2,BB}[k]$ are combined by temporally delaying the second received signal and adding the delayed second received signal $r_{2,BB}[k-\Delta\tau]$ to the first received signal $r_{1,BB}[k]$. This basically results in a conversion of antenna or spatial diversity into multipath diversity.

In case switch 532 or selector 810 alternates between switch positions 1 and 3, the two received signals $r_{1,BB}[k]$ and $r_{2,BB}[k]$ are combined by temporally alternately selecting a sample of the first received signal $r_{1,BB}[k]$ and a sample of the second received signal $r_{2,BB}[k]$ to obtain a stream of interleaved selected samples $r_{c,BB}[m]$ of the first and second received signal. In this case the delay $\Delta\tau$ of delay element 250 is set to zero, i.e., $\Delta\tau=0$.

The combined signal $r_{c,BB}$ is then, in both combining cases, further processed by means of the digital baseband processor 220, which may be a Rake receiver or equalizer, depending on the underlying transmission scheme.

The apparatus 800 may further include a third and a fourth combiner (not shown), wherein the third combiner is configured to weigh and combine samples of the different received signals to a third combined signal in order to configure a maximum receive sensitivity of the plurality of receive antennas. This third combining scheme may be understood as RX beamforming using RX antenna arrays. In this case weighing the different received signals is to be understood as shifting phases of the received signals in order to adaptively form an antenna beam in a direction of the transmitter or a dominant scatterer. The third combining scheme may, however, also be understood as maximum ratio combining of the received signals corresponding to essentially uncorrelated RX antenna signals. In this case the different received signals are weighed with conjugate complex versions of their related channel coefficients. The fourth combiner may be configured to provide a received signal corresponding to a receive antenna experiencing the best signal reception conditions as a fourth combined signal. This fourth combining scheme basically corresponds to selection diversity. In this case, the selector 810 is configured to provide one of the first, second, third or fourth combined signals as the baseband signal 210 for exploiting receive antenna diversity.

To summarize, embodiments allow that a signal of a diversity receive path is combined with a signal of a main receive path prior to a baseband signal processing. One of these combining possibilities is to delay the diversity signal and then add it to the main receiver signal. Another good solution is to alternatively take one sample from the main receiver, one from the diversity receiver, then again one from the main and so on. The baseband then does the usual multipath processing (Rake, Equalizer) to detect the information and determines which combination method results in the best reception and activates this method.

The third combining scheme described above represents antenna selection diversity. The antenna with the better reception is chosen and the datastream to the baseband is chosen accordingly. The decision can be based on a RSSI measurement or better on the signal quality in terms of SNR.

The other methods combine the two receive paths to form a combined signal which has information from both signals.

The fourth combining scheme described above combines the signals of the two antennas by adding them. This results in a directivity of the reception. If the delay of the second path is 0, then the best sensitivity is perpendicular to the connecting line between the two antennas. If a phase shift is applied, then the maximum sensitivity is at another angle relative to the connecting line between the antennas. This is similar to beamforming, however, beamforming is usually done with phase shifters in the RF, not in the digital part. This adaptive beamforming can be applied in scenarios, where a preferred angle of arrival of the radio signal is present.

In the first combining scheme (combiner 230) described above the two RF receivers deliver a signal with the same delay. One of the received signals is then delayed by some time and added to the other. The resulting signal looks like a signal of a multipath reception with one direct path and one reflected path. This signal is passed to the baseband, which already, even if not equipped for diversity, has a Rake receiver or an equalizer integrated to cope with the multipath reception. The Rake receiver performs the multipath reception by setting the rake fingers, which basically do a correlation with a reference sequence at a certain delay and phase, to the delay added in one of the paths. After the de-spreading process the signal of the fingers is added and the resulting signal has a better signal to noise ratio than if only one antenna path would be used. The same is possible with the equalizer. The equalizer estimates the channel impulse response and compensates for it so that the signal looks like a signal without multipath propagation. If there are several delayed signals, the equalizer will add up the received energy at the right delay so that the resulting signal before the detection is again larger than without the second path.

The decision whether to do alternating samples, beamforming, delay diversity or antenna switching is done adaptively depending on some channel estimation results. A criterion to decide for beamforming may be that the number of dominant multipaths does not exceed a certain number (like 1, e.g., all peaks but the strongest are below a certain threshold relative to the strongest peak, the threshold can be non-constant to account for filter side-lobes). The criterion might also change according to velocity estimates, Doppler shift estimates, SNR conditions, overall reception levels, use cases (idle, voice calls, data calls), or according to interference dominated or noise dominated environments.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention include a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer or a digital signal processor. The program code may, for example, be stored on a machine readable carrier.

Other embodiments include the computer program for performing one of the methods described herein, stored on a machine readable carrier.

In other words, an embodiment of the inventive method is, therefore, a computer program having a program code for performing one of the methods described herein, when the computer program runs on a computer or a digital signal processor.

A further embodiment of the inventive method is, therefore, a data carrier (or a digital storage medium, or a computer-readable medium) including, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example, via the Internet.

A further embodiment includes a processing means, for example, a computer, or a programmable logic device, configured to or adapted to perform one of the methods described herein.

A further embodiment includes a computer having installed thereon the computer program for performing one of the methods described herein.

In some embodiments, a programmable logic device (e.g., a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. An apparatus for providing a baseband signal for exploiting receive antenna diversity by means of a digital baseband processor, the apparatus comprising:
   a first combiner configured to temporally alternately select samples of a first received signal corresponding to a first receive antenna and samples of a second received signal corresponding to a second receive antenna and to interleave the selected samples of the first and second received signals to obtain a temporally continuous stream of samples of a baseband representation of a first combined signal at an output of the first combiner as the baseband signal for exploiting receive antenna diversity;
   a second combiner configured to temporally delay the first received signal corresponding to the first receive antenna with respect to the second received signal corresponding to the second receive antenna, and to add the delayed first received signal and the second received signal to obtain a second combined signal; and
   a selector configured to provide, based on an estimated signal quality of the first and/or the second received signal, a baseband representation of one of the first or the second combined signal as the baseband signal for exploiting receive antenna diversity.

2. The apparatus according to claim 1, wherein the second combiner is configured to delay the first received signal such that a signal echo of the first received signal due to a multipath propagation does not temporally interfere with a signal echo of the second received signal.

3. The apparatus according to claim 1, wherein the selector is configured to adaptively provide the baseband signal for exploiting receive antenna diversity based on channel estimates corresponding to the first and/or the second received signal.

4. The apparatus according to claim 1, wherein the selector is configured to provide the second combined signal as the baseband signal for exploiting receive antenna diversity in case of a high Doppler spread of the first and/or the second received signal indicating rapidly changing conditions of communications channels corresponding to the first and/or second received signal.

5. The apparatus according to claim 1, further comprising a third and a fourth combiner, wherein the third combiner is configured to shift phases of samples and combine phase-shifted samples of different received signals to a third combined signal in order to configure a maximum receive sensitivity of a plurality of receive antennas, wherein the fourth combiner is configured to provide a received signal corresponding to a receive antenna experiencing the best signal reception conditions as a fourth combined signal, and wherein the selection means is configured to provide one of the first, second, third or fourth combined signals as the baseband signal for exploiting receive antenna diversity.

6. The apparatus according to claim 1, wherein the selector is configured to provide the second combined signal as the baseband signal for exploiting receive antenna diversity in case of a high Doppler spread of the first and/or the second received signal indicating rapidly changing conditions of communications channels corresponding to the first and/or second received signal.

* * * * *